United States Patent [19]

Tochon

[11] 3,955,990

[45] May 11, 1976

[54] VITROCERAMICS

[75] Inventor: Jean Paul Tochon, Saint-Cloud, France

[73] Assignee: Saint-Gobain Industries, Neuilly-sur-Seine, France

[22] Filed: Feb. 7, 1975

[21] Appl. No.: 547,981

Related U.S. Application Data

[60] Continuation-in-part of Ser. No. 246,847, April 24, 1972, abandoned, which is a division of Ser. No. 37,037, May 13, 1970, abandoned.

[30] Foreign Application Priority Data

May 14, 1969  France .............................. 69.15707

[52] U.S. Cl. .................................. 106/39.6; 65/33; 106/39.7; 106/39.8; 106/51
[51] Int. Cl.² ......................................... C03C 3/22
[58] Field of Search .................... 106/39.6, 39.7, 51; 65/33

[56] References Cited

UNITED STATES PATENTS 3,170,780   2/1965   Takehara et al. .................. 106/39.6

FOREIGN PATENTS OR APPLICATIONS 1,345,069   10/1964   France .............................. 106/39.6
848,447     9/1960    United Kingdom ................ 106/39.6

Primary Examiner—Helen M. McCarthy
Attorney, Agent, or Firm—Pennie & Edmonds

[57] ABSTRACT

Vitroceramic products having a dispersed devitrified phase in a vitreous body, of fine grain, are made from particular compositions having specific limitations as to the content of particular ingredients, by methods which involve a controlled nucleation, a period of rest at an intermediate temperature, a controlled increase in temperature to achieve advanced crystallization, and a period of rest before cooling freely. All operations are carried out below the softening point of the glass and preferably between the point of thermal dilation and below softening temperature. The qualities of the products can be varied by changes in qualitative and quantitative composition.

7 Claims, No Drawings

VITROCERAMICS

This application is a continuation-in-part of my corresponding application Ser. No. 246,847 filed Apr. 24, 1972, now abandoned, in turn, was a division of Application No. 37,037 filed May 13, 1970 which latter case is now abandoned.

This invention relates to the manufacture by novel processes of novel vitroceramic compositions and products. It also involves novelty in the mixtures of raw materials employed to make the novel compositions.

Vitroceramic products, also called vitrocrystalline products are prepared from molten glasses, shaped by the techniques which are usual in the glass industry, and transformed more or less completely into polycrystalline products by thermal treatments, called ceramication, which are employed after the shaping. The proportion of the vitreous phase remaining in the final product is a result of the thermal treatment undergone by the glass during the treatment of ceramication. That treatment usually includes two essential phases, one called nucleation during which the germs form as a result of the presence of special agents, called nucleating agents, in the glass, and a later phase in which these germs are developed out of the vitreous matter. Nucleation is carried out at a temperature slightly superior to the softening temperature of the glass and the development of the crystals is carried out at higher temperatures. The production of vitroceramic products habitually requires special compositions and onerous techniques.

The process of nucleation, furthermore, as well as the subsequent period of crystallization at the higher temperature necessary to achieve the most favorable conditions for the development of crystals are delicate and difficult to perform. They are situated in effect in the regions of temperature where the vitreous phase is largely predominant and is in a plastic state. As these treatments are generally several hours long the products tend to be deformed, in particular flat vitroceramic products of large dimensions, and molded objects of curvilinear form are apt to depart from their initial shapes.

The present invention concerns the manufacture of vitroceramic products from the usual raw materials of the glass industry using ordinary agents of opacification, specifically the fluorides. The invention also contemplates the processes of nucleation and crystallization in a range of temperatures such that the products retain sufficient rigidity to prevent deformation. The invention also lowers the temperatures which are necessary for the fusion and the ceramication of the products, it thus becoming possible to use ordinary types of apparatus which are customarily employed in glass technology for certain thermal treatments.

The products according to the present invention are made at low cost but have physical and chemical characteristics which make them suitable for many uses, such as plates, panels, and bricks for use in covering walls and floors, articles of various shapes resistant to air, to thermal shock, and to chemical agents such as are destined for use in the chemical industry or in the kitchen, and for shapes having good mechanical properties.

The objects of the invention are accomplished generally speaking by the following compositions expressed in weight percent: $Al_2O_3 + SiO_2$ — 57–63% of which $Al_2O_3$ is 4–10%; $CaO + MgO$ — 20–26% of which CaO is 13–20% and MgO is 3.5–8%; $Na_2O + K_2O$ — 9–12% and $Na_2O > K_2O$; F — 5–9%; BaO < 10% and ZnO < 5% may be present in replacement of equimolar parts of MgO, the said composition being vitreous with a dispersed devitrified phase.

According to the invention the total of the essential elements thus defined represents at least 95% of the total weight of materials which constitute the vitroceramic products of the invention. The elements found as impurities are preferably only 2.5% or less of the composition and do not modify the definition as stated. Thus, it is possible to use various raw materials of low price in the proportions imposed by the content of essential elements as stated, for instance natural feldspathic rocks containing on the order of 1% $Li_2O$, 0.5% $P_2O_5$, 0.1% $SnO_2$, 0.1% BeO, or blast furnace slags containing something like 1% FeO, 1% $TiO_2$, 1% MnO, 1% S, and 0.3% $P_2O_5$, of which the content in impurities is not generally critical.

The composition of the invention allow the manufacture of vitroceramics of different colors because they are compatible with numerous coloring agents, such as the pigments CoO, CuO, $Cr_2O_3$, NiO, but in the absence of coloring agents the products are either white or pale in oxidizing fusion. The constitution of these vitroceramics allows the fusion to be carried out in ordinary melting furnaces at relatively low temperature, which has the advantage of reducing the losses of fluorine and of stabilizing the content of that wlement. This composition is also easier to work than many others and produces a fine crystalline structure, that is to say a fine grain. Among the alkali metal oxides sodium oxide is most used because of cost and excellence of performance. Some of it, preferably less than a half, may be replaced by a molar equivalent of $K_2O$ with a view to facilitating the operations of shaping and ceramication by modifying the characteristics of viscosity and devitrification of the glass.

The invention also has as an object the production of vitroceramics by a novel process in which the beginning of nucleation is carried out at a temperature lower than that which corresponds to $T_k$, the temperature of dilatometric melting, and after nucleation the temperature of the glass is raised slowly at a rate which may attain about 5°C. per minute or even more until crystallization is proceeding satisfactorily. It is a characteristic of the novel process that the whole treatment of nucleation proceeds at a temperature not higher than 650°C. for a duration generally less than 3 hours. Another characteristic of the process is that the crystallization is carried out at a temperature not substantially above 900°C. and generally about 800°–850°C.

EXAMPLE 1

The influence of the thermal treatment is important as demonstrated by the present example.

A glass having the following composition was melted and fined at 1350°C. For ready reference the compositions will be numbered:

Glass 1; $SiO_2$ — 55.38% by weight, $Al_2O_3$ — 5.95% by weight, CaO — 19.36% by weight, MgO — 4.60% by weight, $Na_2O$ — 9.50% by weight, F — 5.20% by weight.

The proportions of the various raw materials are indicated in the general table which is provided at the end of the specification. Plates were poured from this melt and submitted to the following thermal treatments:

A. Heating to 600°C. at 5°C. per minute, holding at 600°C. for 15 minutes, heat at 850°C. at 5°C per minute, held at 850°C. for 15 minutes, cool freely. By cooling freely we mean that the glass is allowed to rest in the furnace while it cools off, the furnace having a rapid cooling rate.

B. The first step was as in A, the temperature of 600°C. was held for an hour, the third step was as in A, and the temperature of 850°C. was held for an hour, cooling was the same.

C. The first step was the same as in A except that the temperature was carried to 650°C., the temperature of 650°C. was held for 2 hours, heating was from 650° to 900°C. at 5°C. per minute, the temperature was held at 900°C. for 2 hours, and cooling was freely.

D. The first three steps are the same as in C, but the temperature was held at 900°C. in the fourth step for 8 hours. Cooling was the same.

The particular furnace had low thermal inertia of about 500°C. per hour.

The mechanical resistance of the glass thus prepared was determined with the aid of an apparatus which included a system of circular flexion. The test pieces were parallelepipidic 130 × 10 × 4 mm. Vitroceramic 1A had a resistance of flexing of 10 kg./mm$^2$; 1B had a resistance of 13.3 kg./mm.$^2$; 1C had a resistance of 14.4 kg./mm.$^2$; 1D had a resistance of 16.3 kg./mm.$^2$. By comparing 1A and 1B with 1C and 1D it appears that the resistance to bending is improved by extending the treatment but that the values sufficient for numerous applications are obtained by the use of short treatments which are carried out at low cost.

EXAMPLE 2

The following glasses were melted and fined at 1350°C.:

Glass 2A: $SiO_2$ — 55.75% by weight, $Al_2O_3$ — 5.95% by weight, CaO — 17.30% by weight, MgO — 6.20% by weight, $Na_2O$ — 9.60% by weight, F — 5.2% by weight.

Glass 2B: $SiO_2$ — 55.86% by weight, $Al_2O_3$ — 5.88% by weight, CaO — 13.02% by weight, MgO — 9.30% by weight, $Na_2O$ — 10.81% by weight, F — 5.14% by weight.

Test pieces from these glasses, as described above, were given the following thermal treatment:

Heat to 600°C. at 5°C. per minute, hold for 1 hour, heat from 600° to 800°C. at 5°C. per minute, hold at 800°C. for 1 hour, cool freely. The resistance to circular flexion was as follows:

Glass 2A — 10 kg./mm.$^2$; Glass 2B — 9 kg./mm.$^2$. It is demonstrated by this example that on the one hand the change in the content of alkaline earth oxide has only a small influence on the mechanical properties of the product when the respective contents of CaO and MgO vary at the expense of one another. But, on the other hand, that such variations modify certain other properties of these glasses, for example their viscosity and their characteristics of devitrification. This double consideration permits the choice of compositions particularly adapted to methods of manufacture for particular uses. The optimum of the mechanical properties corresponds generally to a value of the weight ratio CaO/MgO near 4. In practice the problem of cost reduces interest in compositions in which this ratio has a value less than 2.

EXAMPLE 3

Glasses 3A, 3B, 3C, and 3D have a constant CaO content but differing contents of the other bivalent metal oxides. The last three columns on the following chart indicate the regimen of nucleation and crystallization in terms of hours and degrees centigrade, and the value of resistance to circular flection of the test pieces:

| Glasses | $SiO_2$ | $Al_2O_3$ | CaO | MgO | BaO | ZnO | $Na_2O$ | F | hr. | °C. | hr. | °C. | kg./mm.$^2$ |
| --- | --- | --- | --- | --- | --- | --- | --- | --- | --- | --- | --- | --- | --- |
| 3A | 54.72 | 5.85 | 19.04 | 10.46 | — | — | 4.70 | 5.2 | 2 | 650 | 2 | 850 | 10 |
| 3B | 54.70 | 5.86 | 19.00 | 4.66 | — | 6.15 | 4.70 | 4.9 | 2 | 580 | 2 | 780 | 12.6 |
| 3C | 51.96 | 5.55 | 18.00 | 2.17 | 8.22 | — | 8.90 | 5.2 | 4 | 550 | 4 | 750 | 11 |
| 3D | 55.30 | 8.00 | 17.64 | 4.18 | 1.00 | — | 8.68 | 6 | 1 | 600 | 1 | 845 | 11.9 |

The increase and descent of the temperature was made as in the preceding example. One observes first of all that a sharp increase in the content of MgO is without much interest. Also, the substitution of BaO or ZnO has a favorable effect on the temperatures of the thermal treatments necessary to ceramication but increases the time of treatment required.

A further Vitroceramic body according to the invention, similar to those made from the glasses 3A, 3B, 3C and 3D above-described, has the following composition in weight percents:

$Al_2O_3$ + $SiO_2$: 57–63% of which $Al_2O_3$ is 4–10%,
CaO + MgO : 20–26% of which CaO is 13–20% and MgO is 3.5–8%
$Na_2O$ + $K_2O$ : 9–12% and $Na_2O$ > $K_2O$,
F : 5–9%.

EXAMPLE 4

The following glasses were melted under the preceding conditions, it being noted that they are similar in composition except as to fluorine:

Glass 4: $SiO_2$ — 55.80% by weight, $Al_2O_3$ — 6.0% by weight, CaO — 19.50% by weight, MgO — 4.63% by weight, $Na_2O$ — 9.57% by weight, F — 4.5% by weight.

Glass 5: $SiO_2$ — 54.33% by weight, $Al_2O_3$ — 5.84% by weight, CaO — 18.99% by weight, MgO — 4.51% by weight, $Na_2O$ — 9.32% by weight, F — 7% by weight.

The test pieces of these glasses were given the following ceramication treatments:

A. Heat at 600°C. at 5°C. per minute, hold for 1 hour heat to 800°C at 5°C. per minute, hold for 1 hour, cool freely.

B. Step 1 is the same, hold for 2 hours, step 3 is the same, hold for 2 hours, step 5 is the same.

Vitroceramic 4 (A) had a resistance of 7.8 kg./mm.$^2$, 5 (A) had a resistance of 10.2 kg./mm.$^2$, 4 (B) had a resistance of 8.4 kg./mm.$^2$, and 5 (B) had a resistance of 11 kg./mm.$^2$, indicating an increase of resistance of about 30% when fluorine was increased from 4.5 to 7%. It is remarkable that a glass of the same basic composition as glasses 4 and 5 which contained only 4% of fluorine remained vitreous after the same thermal treatments.

EXAMPLE 5

Glasses 4 and 5 were provided respectively with 5.2 and 7% of fluorine and used to test for deformation by elongation during the thermal treatment. The test pieces 120 × 25 × 8 mm. were suspended vertically from a long side without additional weight and given the following treatment:

Heat to 550°C. per minute, heat from 550°C. to 750°C. at 1°C. per minute, heat from 750°C. to 830°C. at 3°C. per minute, hold for 1 hour, and cool freely. Deformation was observed by the measurement of elongation in the vicinity of the gripping points of the suspending tongs, that is to say under a weight corresponding to a portion of about 100 mm. of the length of the test pieces representing approximately 25 g./cm.$^2$ of section. This elongation was about 4% for glass 4 and only 1% for the higher in fluorine, glass 5.

EXAMPLE 6

The glasses used were similar to 4 and 5: Glass 6: 57.3 SiO$_2$, 6.00 Al$_2$O$_3$, 17.8 CaO, 4.50 MgO, 5.1 F. A part of the Na$_2$O was replaced mole for mole by K$_2$O. The final content was as in 4 and 5 except that 6A contains 6.12% Na$_2$O and 3.11% K$_2$O and 6B contains 6.0% Na$_2$O and 3.05% K$_2$O. The deformation during thermal treatment was carried out as in Example 5 except that different tractive efforts were applied. A first set of test pieces were subject only to their own weight, corresponding to a weight of about 10 cm. below the level of the gripping tongs. The test pieces of a second load had additional weight corresponding to a weight of about 50 cm. and a third had additional weight corresponding to a weight of about 150 cm. The elongation was measured and averages, producing the following figures:

Weight in g./cm$^2$ at the level of the tongs: Glass 6A — 25, 125 and 375; glass 6B — 25, 125, 375. These figures correspond respectively to lengths of glass below the tongs of respectively 10, 50 and 150 cm. The elongation of glass 6A was 0.5% for a load of 25 g./cm$^2$, There was no appreciable elongation of glass 6B, showing that the increase from 5.14% fluorine to 7% fluorine eliminated flow under these conditions. A partial substitution of Na$_2$O by K$_2$O further diminished flow (elongation). Such glasses are consequently particularly useful for the manufacture of articles which are liable to be deformed by strains occurring during thermal treatment, for instance during the course of ceramication. Such compositions substantially reduce the length of thermal treatment.

EXAMPLE 7

The table below shows the influence of alkali metal content and of the substitution of K$_2$O for Na$_2$O on similar glass compositions. The heating and cooling are carried out under the conditions:

| Glasses | SiO$_2$ | Al$_2$O$_3$ | CaO | MgO | Na$_2$O | K$_2$O | F | hr. | °C. | hr. | °C. | kg./mm.$^2$ |
|---|---|---|---|---|---|---|---|---|---|---|---|---|
| 7A | 56.56 | 5.92 | 19.76 | 4.68 | 6.48 | 1.40 | 5.2 | 1 / 2 | 600 | 1 / 2 | 800 | 11.5 |
| 7B | 51.82 | 5.57 | 18.11 | 4.30 | 15 | — | 5.2 | 2 | 650 | 2 | 850 | 8 |
| 7C | 55.70 | 5.83 | 19.47 | 4.60 | 3.64 | 5.54 | 5.2 | 1 / 1 | 600 | 1 / 1 | 800 | 6.7 |

EXAMPLE 8

In this example the raw materials include a blast furnace slag. The weight in grams of the raw materials used to produce each 100 grams of glass was as follows:

Slag — 30.9; talc — 8.7; fluorspar — 14; sodium sulfate — 21.8; hydrated alumina [Al(CH)$_3$] — 0.3; sand 40.7.

The composition of the slag in essential elements expressed in weight percent was: SiO$_2$ — 33.38; CaO — 40.50; Al$_2$O$_3$ — 16.20; MgO — 5.8.

The respective contents in impurities TiO$_2$, MnO, FeO, P$_2$O$_5$, and S were of the order described hereinabove in the specification.

Glass 8 contained 53% by weight SiO$_2$, 5.6% by weight Al$_2$O$_3$, 21.2% by weight CaO, 4.4% by weight MgO, 9% by weight Na$_2$O, 6.2% by weight F.

Nucleation from 0° to 600°C. took 2 hours and from 600° to 850°C. took 2 hours. The conditions of rest, cooling and test were similar. The resistance to circular bending was 13.5 kg./mm.$^2$. The nucleation and ceramication of the products of the invention may be carried out in ordinary furnaces having appropriate speed and heat control so that the objects can be put through a series of heating zones graduated to achieve the temperature control indicated in the examples. Flat objects may be suspended across the furnace and parallel to one another and objects of hollow or curved type may be supported appropriately as their shapes allow.

The products of the invention have been subjected to many tests and have the following general characteristics:

Excellent resistance to mechanical bending which generally lies between 10 and 20 kg./mm.$^2$; high resistance to corrosion by chemicals and water, for example in a water attack test, identically conducted, 29 mg. of ordinary window glass were dissolved and less than 12 mg. of a vitrocrystalline product corresponding to composition 3 after treatment B; the softening temperature was between 900° and 1000°C; hardness (microdurometor Reichert) was on the order of 700 kg./mm.$^2$; good resistance to abrasion; coefficient of dilatation from 60 to 130 × 10$^{-7}$, which is compatible with the manufacture of objects armored with internal metallic webbing; good resistance to thermal shock, for instance test pieces 80 × 30 × 5 mm. heated to 400°C. were plunged into cold water without breaking.

It is to be noted that not all of these excellent properties are invariably produced together, through all the ranges of manufacturing conditions, making it advisable to choose the composition and the thermal treatments which are most appropriate to the particular necessities of a final use. These vitroceramic materials are used in very different fields: Architecture, tiles, slates; in construction for conduits, canals and pieces which are to resist wear; and kitchenware. In the following table is set forth the proportions of raw materials which may be employed to prepare vitrifiable mixtures useful in the preparation of the foregoing examples. These proportions are given generally in grams for 100 grams of the glass which is to undergo the novel process:

| Glass No. | 1 | 2A | 2B | 4 | 5 | 6A | 6B |
|---|---|---|---|---|---|---|---|
| Sand | 47.97 | 55.75 | 56.52 | 56 | 54.52 | 14.80 | 14.38 |
| Hydrated alumina |  | 4.99 | 4.99 | 9.21 | 3.38 |  |  |
| Kaolin | 15.82 |  |  |  |  |  |  |
| Feldspar |  |  |  |  |  | 54.31 | 52.60 |
| Sodium carbonate | 16.32 | 8.05 | 10.38 | 16.47 | 4.58 | 8.43 | 8.16 |
| Cryolite |  | 11.02 | 11.02 |  | 15.28 |  |  |
| Fluorspar | 12.83 |  |  | 11.10 |  | 12.83 | 17.27 |
| Limestone | 4.26 | 30.89 | 23.51 | 4.45 | 34.50 |  |  |
| Magnesium carbonate |  | 12.96 | 19.58 |  | 11.32 |  | 4.44 |
| Dolomite | 26.28 |  |  | 26.46 |  | 25.71 | 15.30 |

The glasses resulting from the fusion of the raw materials in this table are those which are frequently employed because they have excellent properties and a low price, which makes them suitable for a large variety of uses. They fuse easily, their loss of fluorine is low, they have a very low tendency to spontaneous devitrification, they crystallize easily as to time, temperature, and with a minimum of flow, and their mechanical and chemical resistance is very good.

As many apparently widely different embodiments of the present invention may be made without departing from the spirit and scope thereof, it is to be understood that the invention is not limited to the specific embodiments.

What is claimed is:

1. A vitroceramic body consisting essentially of the following ingredients in the approximate weight percent:

| | |
|---|---|
| $Al_2O_3 + SiO_2$ | 57–63% of which $Al_2O_3$ is 4–10%, |
| CaO + MgO | 20–26% of which CaO is 13–20% and MgO is 3.5–8%, |
| $Na_2O + K_2O$ | 9–12% and $Na_2O > K_2O$, |
| F | 5–9%, |
| BaO | <10%, |
| ZnO | <5%, |
| Impurities | <5%, | the BaO and ZnO when present replacing equimolar parts of MgO, the said composition being vitreous with a dispersed devitrified phase and being substantially devoid of sulfur.

2. A vitroceramic composition according to claim 1 in which the impurities are less than about 2½% by weight.

3. A vitroceramic body according to claim 1 in which the ratio by weight of CaO to MgO is between about 2 and 4.

4. A vitroceramic body having a vitreous constitution with a dispersed devitrified phase which consists essentially of about 55.3% weight % $SiO_2$, 5.9% $Al_2O_3$, 19.3% CaO, 4.6% MgO, 9.5% $Na_2O$, and 5.2% F and being substantially devoid of sulfur.

5. A vitroceramic body having a vitreous constitution with a dispersed devitrified phase consisting essentially of about 55.3% $SiO_2$, 8% $Al_2O_3$, 17.6% CaO, 4.2% MgO, 1% BaO, 8.7% $Na_2O$, 6% F and being substantially devoid of sulfur.

6. A vitroceramic body having a vitreous constitution with a dispersed devitrified phase consisting essentially of about 54.3% $SiO_2$, 5.8% $Al_2O_3$, 19% CaO, 4.5% MgO, 9.3% $Na_2O$, and 7% F and being substantially devoid of sulfur.

7. A vitroceramic body having a vitreous constitution with a dispersed devitrified phase consisting essentially of about 57.3% $SiO_2$, 6% $Al_2O_3$, 17.8% CaO, 4.5% MgO, 6.1% $Na_2O$, 3.1% $K_2O$, and 5.1% F and being substantially devoid of sulfur.

* * * * *

UNITED STATES PATENT AND TRADEMARK OFFICE
CERTIFICATE OF CORRECTION

PATENT NO. 3,955,990

DATED : May 11, 1976

INVENTOR(S) : JEAN PAUL TOCHON

It is certified that error appears in the above-identified patent and that said Letters Patent are hereby corrected as shown below:

Column 3, line 2, for "heat at" read -- heat to; line 39, for "of flexing" read -- to flexing -- .

Column 4, line 66, for "Heat at" read -- Heat to -- .

Column 5, line 32, for "550° C. per minute" read -- 550° C. at 5° C. per minute -- .

Signed and Sealed this

Fourteenth Day of September 1976

[SEAL]

Attest:

RUTH C. MASON
*Attesting Officer*

C. MARSHALL DANN
*Commissioner of Patents and Trademarks*